US007556001B2

(12) United States Patent
Kim et al.

(10) Patent No.: US 7,556,001 B2
(45) Date of Patent: Jul. 7, 2009

(54) OIL CONTROL VALVE OF A VEHICLE ENGINE

(75) Inventors: Woong Kim, Hwaseong (KR); Jae-Ho Jung, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/641,440

(22) Filed: Dec. 19, 2006

(65) Prior Publication Data

US 2008/0035087 A1 Feb. 14, 2008

(30) Foreign Application Priority Data

Aug. 10, 2006 (KR) ..................... 10-2006-0075642

(51) Int. Cl.
*F01L 1/34* (2006.01)

(52) U.S. Cl. ............... 123/90.17; 123/90.15; 123/90.31

(58) Field of Classification Search ............. 123/90.17, 123/90.15, 90.31; 137/625.65
See application file for complete search history.

(56) References Cited

U.S. PATENT DOCUMENTS 6,810,842 B2 * 11/2004 Itou ........................ 123/90.15
2003/0101949 A1 * 6/2003 Uchida .................... 123/90.12

FOREIGN PATENT DOCUMENTS

JP 09317412 A * 12/1997
JP 2000073716 A * 3/2000
JP 2000-145471 5/2000
KR 1020040058620 7/2004

OTHER PUBLICATIONS

Abstract of JP 09317412.*

* cited by examiner

*Primary Examiner*—Zelalem Eshete
(74) *Attorney, Agent, or Firm*—Morgan, Lewis & Bockius LLP

(57) ABSTRACT

An oil control valve includes an operation unit at an upper part of a cam cap and an inner part of a head cover that changes a path of fluid into a continuously variable valve timing unit, and a connector that supplies power to the operation unit. The operation unit may include a sleeve, a valve movably located at the sleeve that directly changes the path of the fluid, and a driving portion that drives the valve. The connector may be located at the driving portion and exposed to outside the head cover. The driving portion may be higher than the sleeve, and may be inclined by approximately 30° with respect to a horizontal line. A hydraulic line may further be provided in the cam cap to guide the fluid into chambers of the continuously variable valve timing unit.

5 Claims, 6 Drawing Sheets

"OCV"
300
100
30±1°
520
30
"H.L"
500
10
:Movement path of oil

OIL CONTROL VALVE OF A VEHICLE ENGINE

CROSS-REFERENCE TO RELATED APPLICATION

This application claims priority to and the benefit of Korean Patent Application No. 10-2006-0075642 filed in the Korean Intellectual Property Office on Aug. 10, 2006, the entire contents of which are incorporated herein by reference.

BACKGROUND OF THE INVENTION (a) Field of the Invention

The present invention relates to an oil control valve of a vehicle engine.

(b) Description of the Related Art

Generally, an oil control valve of a vehicle engine is a component of a continuously variable valve timing (CVVT) device. The oil control valve changes a path of engine oil supplied from a hydraulic pump to the CVVT device under control of an engine control unit, and adjusts opening and closing times of an exhaust or intake valve.

Such an oil control valve includes a connector, a plunger with a permanent magnet, a coil, a spool connected to the plunger, and a sleeve. When the connector is supplied with power, a magnetic field is formed by the coil and the plunger. The plunger and spool move due to the magnetic field. A hydraulic line formed as a position between the spool and the sleeve is thus moved.

Consequently, when oil flows into an advance angle chamber or retard angle chamber of the CVVT device along such a hydraulic line, valve overlap, i.e. intake and exhaust valves being open simultaneously, is changed by such inflow of oil. Valve overlap is advantageous in common regions while it is disadvantageous in low or high speed regions. Accordingly, value overlap should be changed as described above in order to improve engine output.

However, since a conventional oil control valve is located at a cylinder head in a lower part of a cam cap, it may be directly exposed to heat radiated from a combustion chamber. Therefore, an oil control valve can be easily deteriorated. Particularly, when an oil control valve is located near an exhaust valve, deterioration speed of an oil control valve is increased because the oil control valve is directly exposed to hot exhaust gas.

In addition, since one end of the conventional oil control valve is inclined downward at a plunger, oil gathers at the plunger. Since oil gathered at the plunger may interrupt movement of the plunger, advancing or retarding responsiveness is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an oil control valve that minimizes damage to the oil control valve caused by heat and is relatively more responsive.

An oil control valve according to an exemplary embodiment of the present invention includes an operation unit that changes a-path of fluid into a continuously variable valve timing unit, and a connector that applies power to the operation unit. The operation unit is located at an upper part of a cam cap and an inner part of a head cover.

The operation unit may include a sleeve portion, a valve portion that is movably located at the sleeve portion and directly changes the path of the fluid, and a driving portion that is located at one side of the sleeve portion and drives the valve portion. The connector may be located at the driving portion and be exposed to an outside of the head cover.

In addition, the driving portion may be located higher than the sleeve portion. Particularly, the driving portion may be inclined upward 30±1° with respect to a horizontal line.

A hydraulic line portion may be provided in the cam cap in order for the fluid to be guided into an advance angle chamber and retard angle chamber of the continuously variable valve timing unit.

In addition, the operation unit may be located at a camshaft for an exhaust valve in the upper part of the cam cap when the continuously variable valve timing unit is connected to the camshaft for the exhaust valve.

DETAILED DESCRIPTION OF THE PREFERRED EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
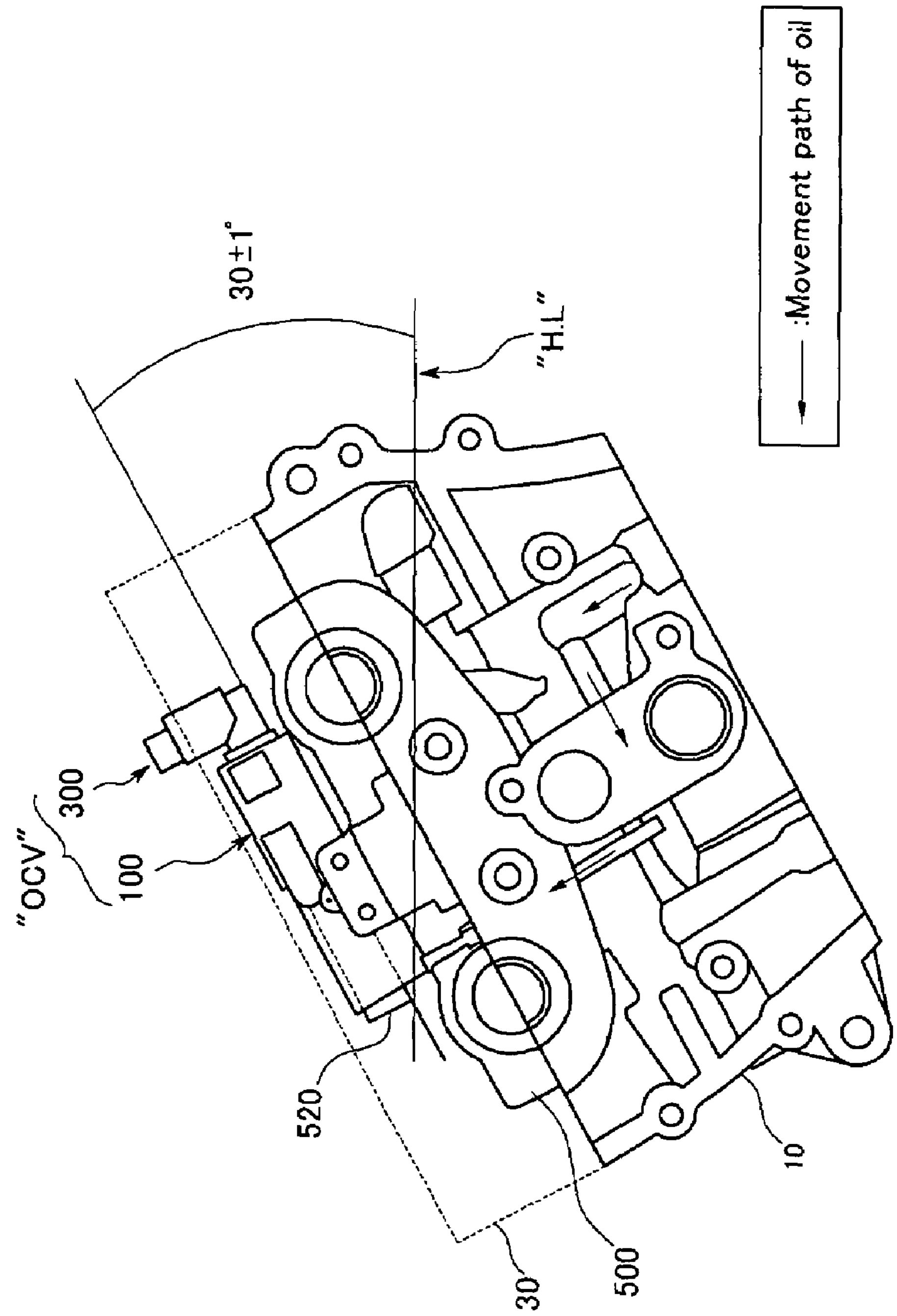
FIG. 1 is a drawing showing an oil control valve according to an exemplary embodiment of the present invention included at an upper part of a cam cap.

As shown in FIG. 1, an oil control valve (OCV) according to an exemplary embodiment of the present invention includes an operation unit 100 and a connector 300.

The operation unit 100 changes a path of oil flowing into a continuously variable valve timing unit (not shown). The connector 300 supplies the operation unit 100 with power.

The operation unit 100 is engaged to the upper part of the cam cap 500 by a mounter 520. Therefore, since the operation unit 100 is located away from a combustion chamber (not shown) of a cylinder head 10, and from an exhaust manifold (not shown), degradation of the oil control valve (OCV) by heat created from the combustion chamber and exhaust gas is prevented.

The operation unit 100 may be located at an inner part of a head cover (30) in order to prevent foreign objects from flowing into the operation unit 100.

Figure 2:
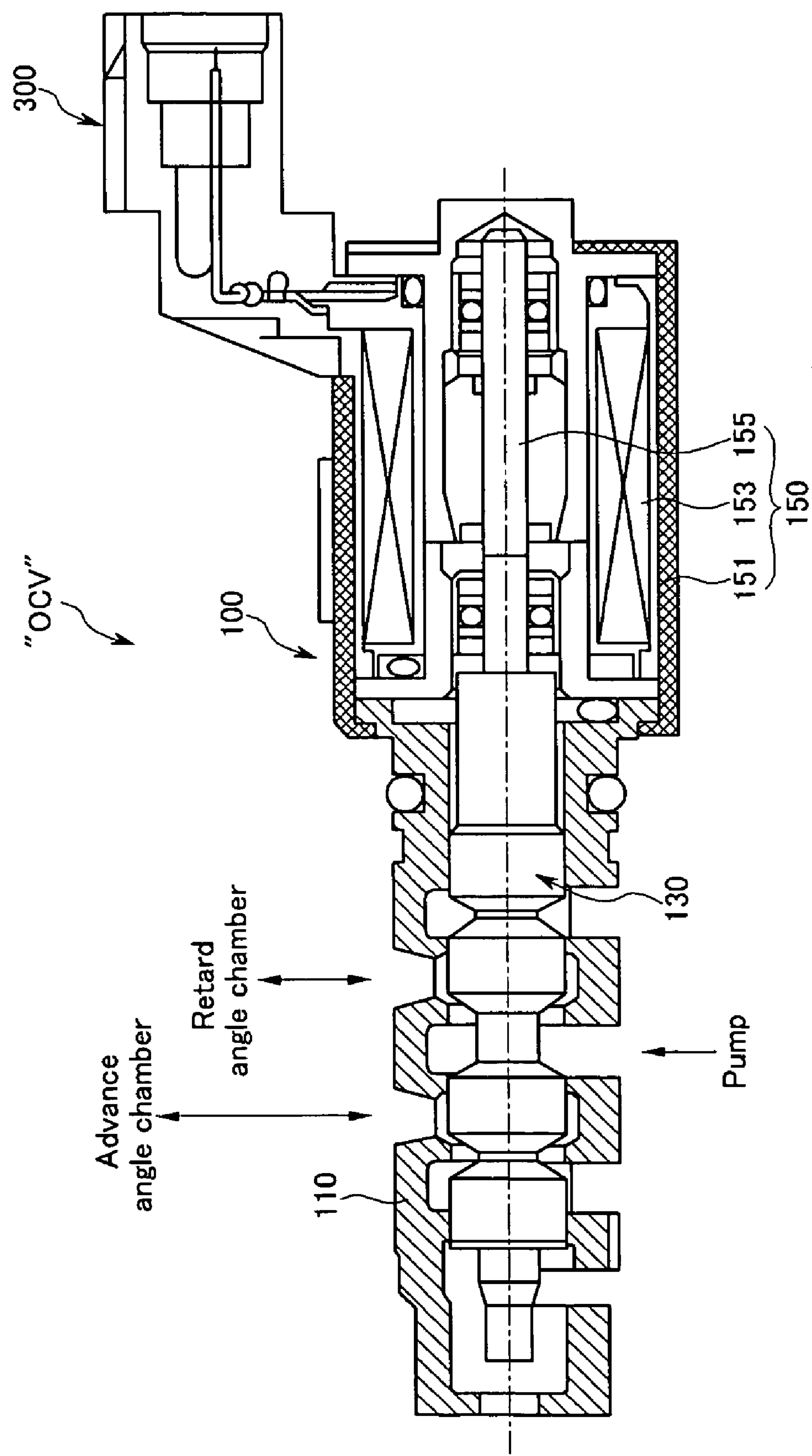
FIG. 2 is a cross-sectional view showing the oil control valve according to an exemplary embodiment of the present invention.

Referring to FIG. 2, the operation unit 100 includes a sleeve portion 110, a valve portion 130, and a driving portion 150.

The valve portion 130 is movably located at the sleeve portion 110 so as to directly change a flow path of oil. The driving portion 150, located at one side of the sleeve portion 110, drives the valve portion 130.

Furthermore, the valve portion 130 is formed as a spool. The driving portion 150 may include a yoke 151, a coil 153, and a plunger 155. When a magnetic field is created at the coil 153 and yoke 155 by power applied to the connector 300, the plunger 155 is moved by such a magnetic field, moving the valve portion 130.

As shown in FIG. 1, the connector 300 located at the driving portion 150 may be exposed at the outside of the head cover (30) in order to be supplied with external power.

It is preferable that the driving portion 150 is located higher than the sleeve portion 110. Accordingly, since the plunger 155 of the driving portion 150 is located higher than oil between the valve portion 130 and the sleeve portion 110, oil can not gather at the plunger 155. Consequently, advancing and retarding responsiveness is not hindered.

Figure 3:
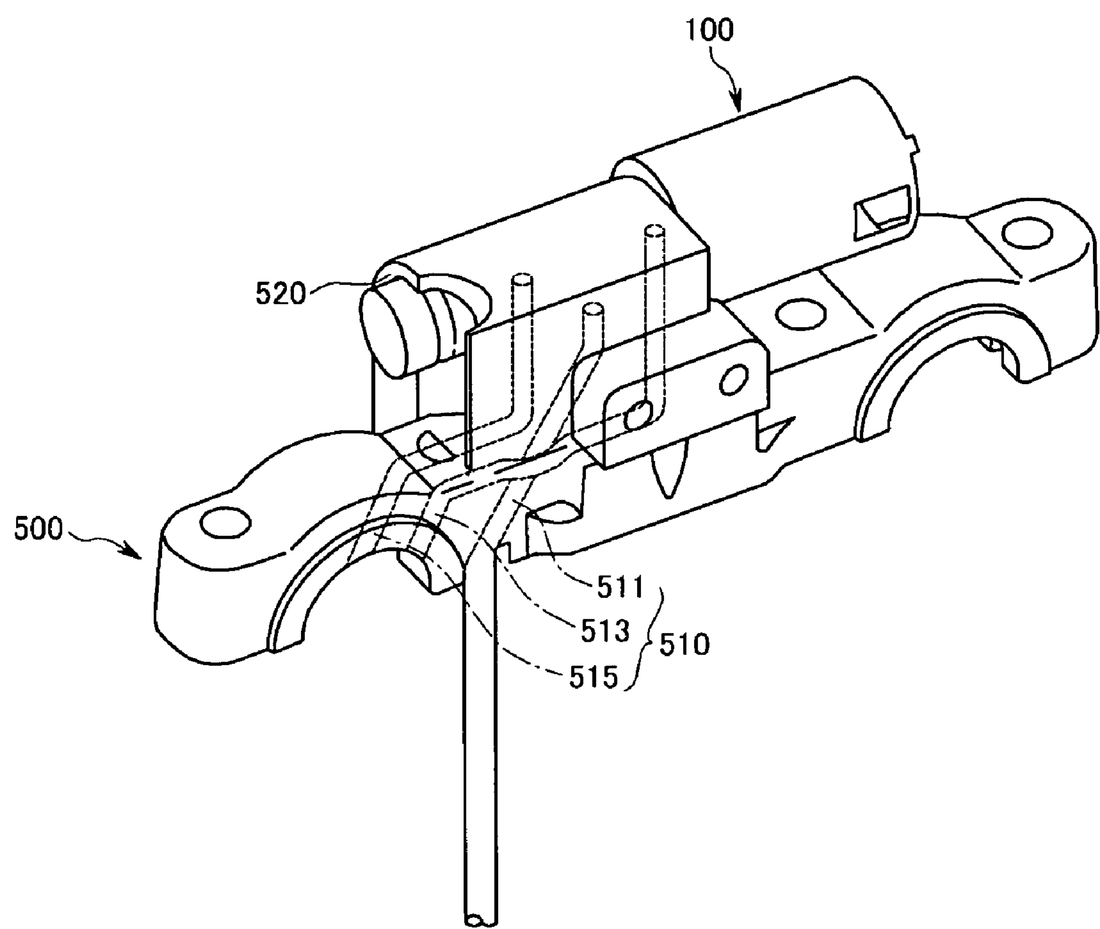
FIG. 3 is a perspective view showing a hydraulic line of the cam cap to which the oil control valve according to an exemplary embodiment of the present invention is mounted.

As shown in FIG. 1, the driving portion 150 may be inclined upward by approximately 30° with respect to a horizontal line H.L. in order to create such height difference In addition, it is preferable that a hydraulic line portion 510 is formed in the cam cap 500 in order for oil to be guided into an advance angle chamber (not shown) and retard angle chamber (not shown) of a continuously variable valve timing unit (not shown). As shown in FIG. 3, the hydraulic line portion 510 may include a supply hydraulic line 511, a retard angle hydraulic line 513, and an advance angle hydraulic line 515.

Particularly, since the operation unit 100 is located at the upper part of the cam cap 500, the retard angle hydraulic line 513 and advance angle hydraulic line 515 need not be located at the cylinder head 10, and additional mounting holes need not be formed on the cylinder head 10 in order to safely mount the operation unit 100. Consequently, since the operation unit 100 is located on the cam cap 500 that is inexpensive and easy to manufacture, cost and total average cycle time are small.

When the continuously variable valve timing unit (not shown) is connected to a camshaft (not shown) for an exhaust valve, namely the oil control valve according to an exemplary embodiment of the present invention is used for controlling opening and closing timings of an exhaust valve, it is preferable that the operation unit 100 is located at the camshaft (not shown) for the exhaust valve in the upper part of the cam cap 500.

Figure 5:
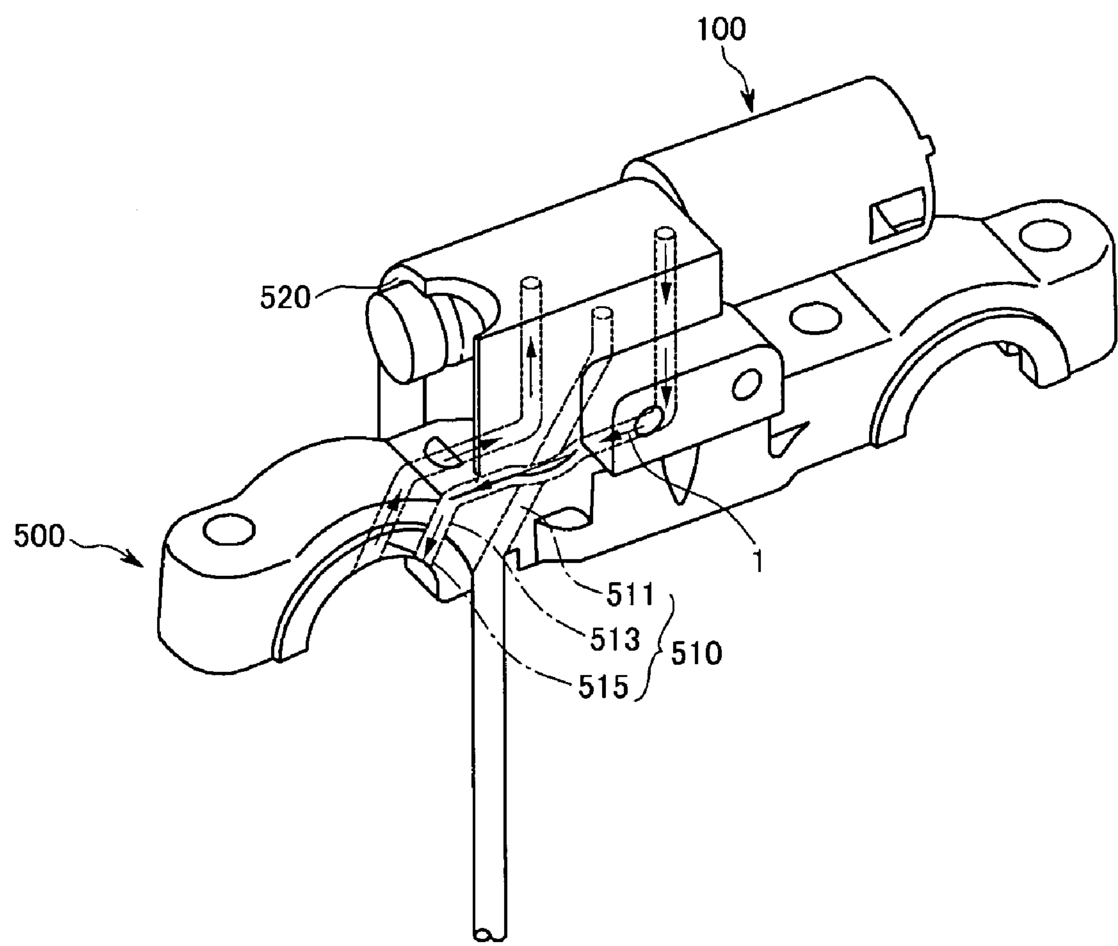
FIG. 5 is a drawing showing a path of oil under a retarded state.
Figure 6:
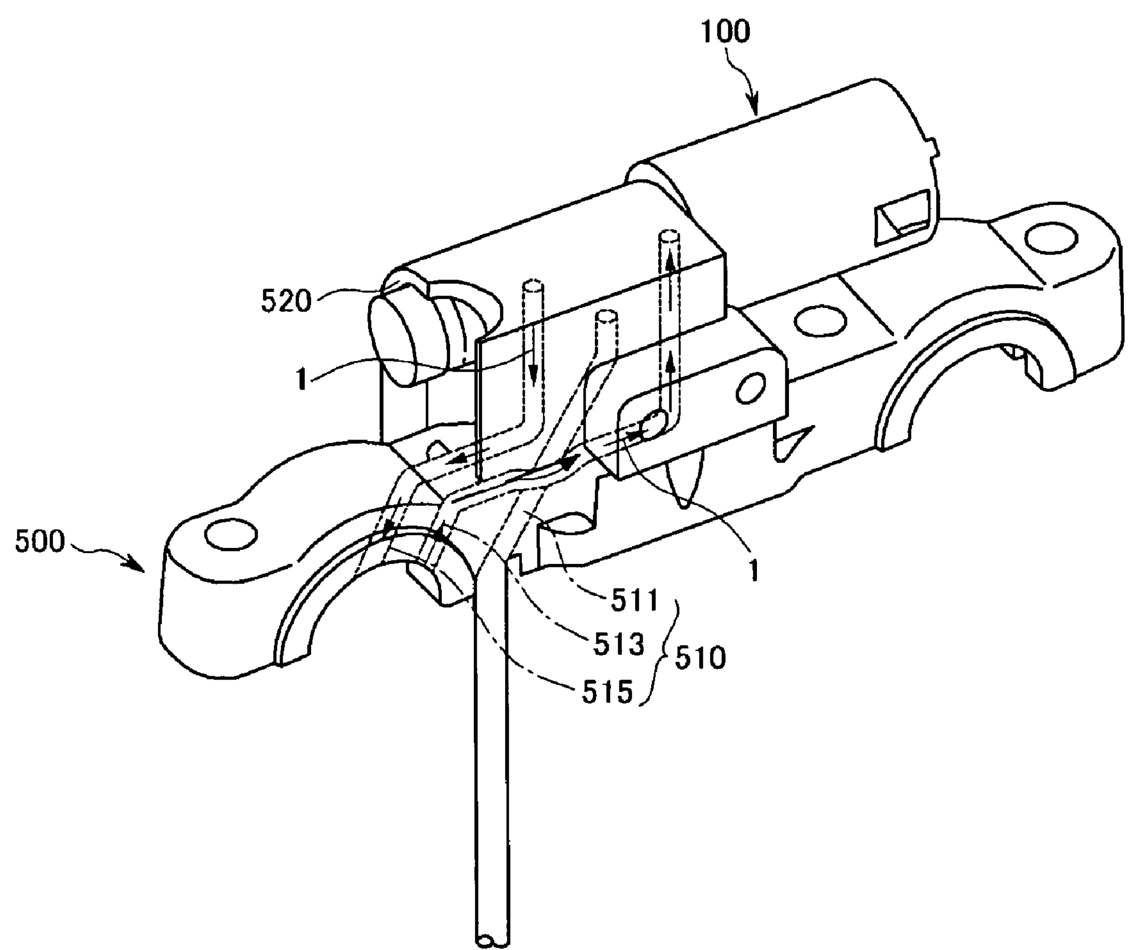
FIG. 6 is a drawing showing a path of oil under an advanced state.

Hereinafter, a path of oil 1 will be described in detail with reference to FIG. 4 to FIG. 6.

Figure 4:
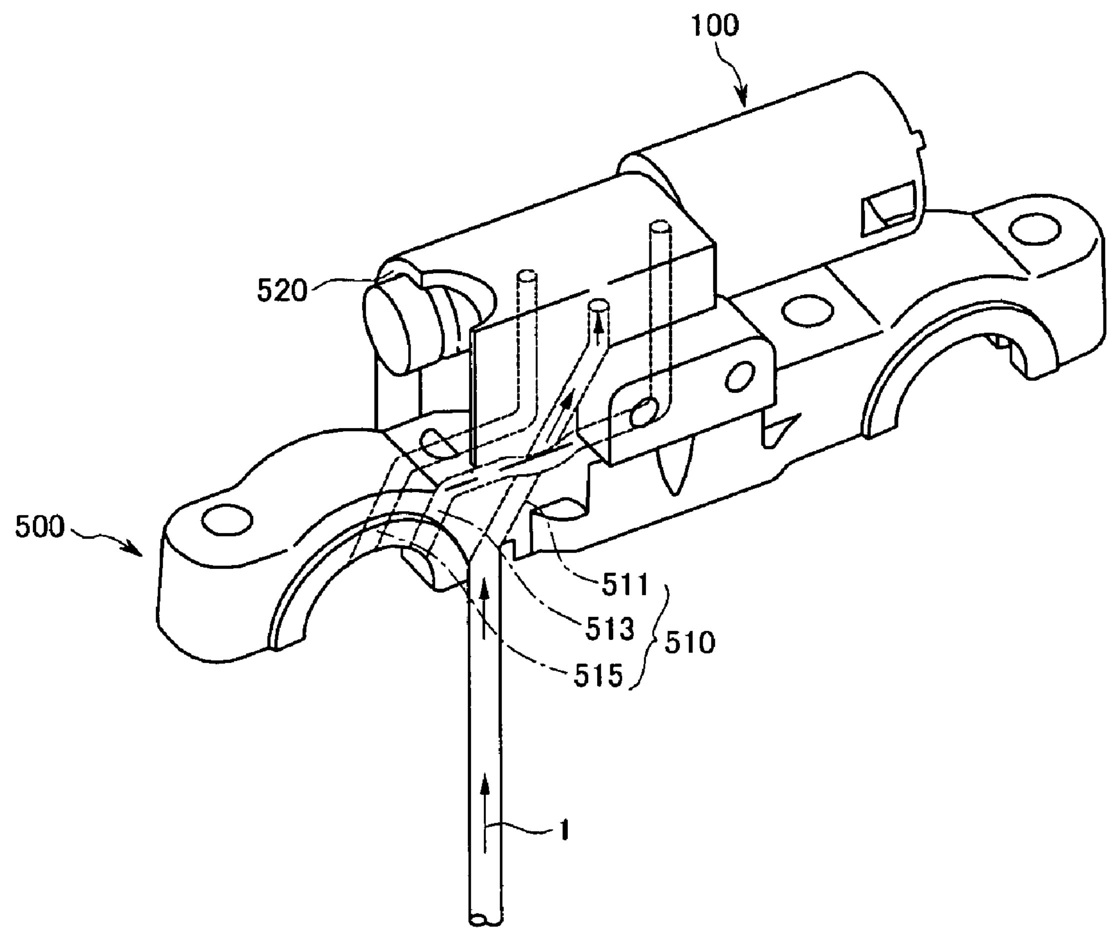
FIG. 4 is a drawing showing oil supplied into the oil control valve according to an exemplary embodiment of the present invention.

As shown in FIG. 4, oil 1 is supplied into the operation unit 100 of the oil control valve (OCV) along the supply hydraulic line 511. In addition, the retarded state or advanced state is determined by a control portion (not shown) according to speed of oil flow. As shown in FIG. 5, the oil 1 under the retarded state flows into the retard angle chamber formed on the continuously variable valve timing unit (not shown) along the retard angle hydraulic line 513. However, as shown in FIG.6, the oil 1 under the advanced state flows into the advance angle chamber formed on the continuously variable valve timing unit (not shown) along the advance angle hydraulic line 515. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An oil control valve comprising:

an operation unit that changes a path of fluid into a continuously variable valve timing unit and is externally mounted onto an upper part of a cam cap and in an inner part of a head cover, wherein a longitudinal direction of the operation unit is aligned substantially parallel to an upper surface of the cam cap; and a connector that supplies power to the operation units, wherein the operation unit further comprises:

a sleeve portion;

at least a hydraulic line fluidly-connecting the cam cap and the sleeve portion;

a valve portion that is movably located at the sleeve portion and directly changes the path of the fluid by selectively opening the hydraulic line; and a driving portion that drives the valve portion, wherein the driving portion is located higher than the sleeve portion.

2. The oil control valve of claim 1, wherein the connector is located at the driving portion and exposed to an outside of the head cover.

3. The oil control valve of claim 1, wherein the driving portion is inclined by approximately 30° with respect to a horizontal line.

4. The oil control valve of claim 1, further comprising a hydraulic line portion provided in the cam cap to guide the fluid into a first and a second chamber of the continuously variable valve timing unit.

5. The oil control valve of claim 1, wherein the operation unit is located at a camshaft for an exhaust valve in an upper part of the cam cap.

* * * * *